(12) United States Patent
Fletcher

(10) Patent No.: US 9,239,950 B2
(45) Date of Patent: Jan. 19, 2016

(54) DIMENSIONING SYSTEM

(71) Applicant: Hand Held Products, Inc., Fort Mill, SC (US)

(72) Inventor: Donna Marie Fletcher, Auburn, NY (US)

(73) Assignee: Hand Held Products, Inc., Fort Mills, SC (US)

(*) Notice: Subject to any disclaimer, the term of this patent is extended or adjusted under 35 U.S.C. 154(b) by 150 days.

(21) Appl. No.: 14/055,234

(22) Filed: Oct. 16, 2013

(65) Prior Publication Data

US 2015/0003673 A1 Jan. 1, 2015

Related U.S. Application Data

(60) Provisional application No. 61/841,717, filed on Jul. 1, 2013.

(51) Int. Cl.
*G06K 9/00* (2006.01)

(52) U.S. Cl.
CPC ........ *G06K 9/00335* (2013.01); *G06K 9/00375* (2013.01)

(58) Field of Classification Search
None
See application file for complete search history.

(56) References Cited

U.S. PATENT DOCUMENTS

| | | |
|---|---|---|
| 3,971,065 A | 7/1976 | Bayer |
| 4,398,811 A | 8/1983 | Nishioka et al. |
| 4,730,190 A | 3/1988 | Win et al. |
| 5,220,536 A | 6/1993 | Stringer et al. |
| 5,331,118 A | 7/1994 | Jensen |
| 5,359,185 A | 10/1994 | Hanson |
| 5,548,707 A | 8/1996 | LoNegro |
| 5,555,090 A | 9/1996 | Schmutz |
| 5,590,060 A | 12/1996 | Granville et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,734,476 A | 3/1998 | Dlugos |
| 5,831,737 A | 11/1998 | Stringer et al. |
| 5,850,370 A | 12/1998 | Stringer et al. |
| 5,869,827 A | 2/1999 | Rando |
| 5,870,220 A | 2/1999 | Migdal et al. |

(Continued)

FOREIGN PATENT DOCUMENTS

| | | |
|---|---|---|
| DE | 10210813 A1 | 10/2003 |
| DE | 102007037282 A1 | 3/2008 |

(Continued)

OTHER PUBLICATIONS

European Search Report for application No. EP13186043 (now EP2722656 (Apr. 23, 2014)): Total pp. 7.

(Continued)

*Primary Examiner* — Siamak Harandi
(74) *Attorney, Agent, or Firm* — Additon, Higgins & Pendleton, P.A.

(57) ABSTRACT

An object-analysis system includes a sensor and a processor. The sensor detects the movement and positioning of a user's hands within a three-dimensional space. The processor is communicatively connected to the sensor, and receives the movement and positioning information from the sensor. The processor determines the dimensions of the object based on the detected movements and positioning of the user's hands substantially adjacent to opposing sides of the object.

20 Claims, 4 Drawing Sheets

(56) References Cited

U.S. PATENT DOCUMENTS

| | | | |
|---|---|---|---|
| 5,900,611 A | 5/1999 | Hecht | |
| 5,923,428 A | 7/1999 | Woodworth | |
| 5,929,856 A | 7/1999 | LoNegro et al. | |
| 5,969,823 A | 10/1999 | Wurz et al. | |
| 5,978,512 A | 11/1999 | Kim et al. | |
| 5,979,760 A | 11/1999 | Freyman et al. | |
| 5,991,041 A | 11/1999 | Woodworth | |
| 6,049,386 A | 4/2000 | Stringer et al. | |
| 6,053,409 A | 4/2000 | Brobst et al. | |
| 6,064,759 A | 5/2000 | Buckley et al. | |
| 6,069,696 A | 5/2000 | McQueen et al. | |
| 6,137,577 A | 10/2000 | Woodworth | |
| 6,177,999 B1 | 1/2001 | Wurz et al. | |
| 6,246,468 B1 | 6/2001 | Dimsdale | |
| 6,336,587 B1 | 1/2002 | He et al. | |
| 6,373,579 B1 | 4/2002 | Ober et al. | |
| 6,457,642 B1 | 10/2002 | Good et al. | |
| 6,517,004 B2 | 2/2003 | Good et al. | |
| 6,674,904 B1 | 1/2004 | McQueen | |
| 6,705,526 B1 | 3/2004 | Zhu et al. | |
| 6,824,058 B2 | 11/2004 | Patel et al. | |
| 6,832,725 B2 | 12/2004 | Gardiner et al. | |
| 6,858,857 B2 | 2/2005 | Pease et al. | |
| 6,971,580 B2 | 12/2005 | Zhu et al. | |
| 7,085,409 B2 | 8/2006 | Sawhney et al. | |
| 7,086,162 B2 | 8/2006 | Tyroler | |
| 7,104,453 B1 | 9/2006 | Zhu et al. | |
| 7,128,266 B2 | 10/2006 | Zhu et al. | |
| 7,159,783 B2 | 1/2007 | Walczyk et al. | |
| 7,277,187 B2 | 10/2007 | Smith et al. | |
| 7,307,653 B2 | 12/2007 | Dutta | |
| 7,413,127 B2 | 8/2008 | Ehrhart et al. | |
| 7,527,205 B2 | 5/2009 | Zhu | |
| 7,586,049 B2 | 9/2009 | Wurz | |
| 7,726,575 B2 | 6/2010 | Wang et al. | |
| 7,788,883 B2 | 9/2010 | Buckley et al. | |
| 7,974,025 B2 | 7/2011 | Topliss | |
| 8,027,096 B2 | 9/2011 | Feng et al. | |
| 8,028,501 B2 | 10/2011 | Buckley et al. | |
| 8,050,461 B2 | 11/2011 | Shpunt et al. | |
| 8,055,061 B2 | 11/2011 | Katano | |
| 8,102,395 B2 | 1/2012 | Kondo et al. | |
| 8,132,728 B2 | 3/2012 | Dwinell et al. | |
| 8,134,717 B2 | 3/2012 | Pangrazio et al. | |
| 8,212,889 B2 | 7/2012 | Chanas et al. | |
| 8,228,510 B2 | 7/2012 | Pangrazio et al. | |
| 8,294,969 B2 | 10/2012 | Plesko | |
| 8,305,458 B2 | 11/2012 | Hara | |
| 8,310,656 B2 | 11/2012 | Zalewski | |
| 8,313,380 B2 | 11/2012 | Zalewski et al. | |
| 8,317,105 B2 | 11/2012 | Kotlarsky et al. | |
| 8,322,622 B2 | 12/2012 | Liu et al. | |
| 8,339,462 B2 | 12/2012 | Stec et al. | |
| 8,350,959 B2 | 1/2013 | Topliss et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,976 B2 | 2/2013 | Mohideen et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,437,539 B2 | 5/2013 | Komatsu et al. | |
| 8,441,749 B2 | 5/2013 | Brown et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,570,343 B2 | 10/2013 | Halstead | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 2002/0118874 A1 | 8/2002 | Chung et al. | |
| 2002/0179708 A1 | 12/2002 | Zhu et al. | |
| 2003/0038179 A1 | 2/2003 | Tsikos et al. | |
| 2003/0053513 A1 | 3/2003 | Vatan et al. | |
| 2003/0091227 A1 | 5/2003 | Chang et al. | |
| 2003/0156756 A1 | 8/2003 | Gokturk et al. | |
| 2004/0024754 A1 | 2/2004 | Mane et al. | |
| 2004/0155975 A1 | 8/2004 | Hart et al. | |
| 2004/0165090 A1 | 8/2004 | Ning | |

(56) References Cited

U.S. PATENT DOCUMENTS

| | | |
|---|---|---|
| 2004/0211836 A1 | 10/2004 | Patel et al. |
| 2004/0233461 A1 | 11/2004 | Armstrong et al. |
| 2005/0117215 A1 | 6/2005 | Lange |
| 2005/0128196 A1 | 6/2005 | Popescu et al. |
| 2006/0151604 A1 | 7/2006 | Zhu et al. |
| 2006/0159307 A1 | 7/2006 | Anderson et al. |
| 2006/0159344 A1* | 7/2006 | Shao et al. .................. 382/186 |
| 2006/0232681 A1 | 10/2006 | Okada |
| 2006/0269165 A1 | 11/2006 | Viswanathan |
| 2007/0031064 A1 | 2/2007 | Zhao et al. |
| 2007/0063048 A1 | 3/2007 | Havens et al. |
| 2007/0181685 A1 | 8/2007 | Zhu et al. |
| 2007/0237356 A1 | 10/2007 | Dwinell et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0164074 A1 | 7/2008 | Wurz |
| 2008/0185432 A1 | 8/2008 | Caballero et al. |
| 2008/0212168 A1 | 9/2008 | Olmstead et al. |
| 2009/0134221 A1 | 5/2009 | Zhu et al. |
| 2009/0268023 A1 | 10/2009 | Hsieh |
| 2009/0313948 A1 | 12/2009 | Buckley et al. |
| 2009/0323084 A1 | 12/2009 | Dunn et al. |
| 2010/0035637 A1 | 2/2010 | Varanasi et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0220894 A1 | 9/2010 | Ackley et al. |
| 2011/0169999 A1 | 7/2011 | Grunow et al. |
| 2011/0202554 A1 | 8/2011 | Powilleit et al. |
| 2011/0249864 A1 | 10/2011 | Venkatesan et al. |
| 2011/0279916 A1 | 11/2011 | Brown et al. |
| 2011/0286007 A1 | 11/2011 | Pangrazio et al. |
| 2012/0056982 A1 | 3/2012 | Katz et al. |
| 2012/0081714 A1 | 4/2012 | Pangrazio et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0185094 A1 | 7/2012 | Rosenstein et al. |
| 2012/0193407 A1 | 8/2012 | Barten |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rhoads et al. |
| 2012/0223141 A1 | 9/2012 | Good et al. |
| 2012/0228382 A1 | 9/2012 | Havens et al. |
| 2012/0242852 A1 | 9/2012 | Hayward et al. |
| 2012/0248188 A1 | 10/2012 | Kearney |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1* | 12/2012 | Galor et al. .................. 345/156 |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0101158 A1 | 4/2013 | Lloyd et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |

(56) References Cited

U.S. PATENT DOCUMENTS

| | | | |
|---|---|---|---|
| 2014/0129378 | A1 | 5/2014 | Richardson |
| 2014/0131441 | A1 | 5/2014 | Nahill et al. |
| 2014/0133379 | A1 | 5/2014 | Wang et al. |
| 2014/0140585 | A1 | 5/2014 | Wang |
| 2014/0151453 | A1 | 6/2014 | Meier et al. |
| 2014/0160329 | A1 | 6/2014 | Ren et al. |
| 2014/0267609 | A1 | 9/2014 | Laffargue |
| 2014/0320408 | A1* | 10/2014 | Zagorsek et al. ............. 345/158 |

FOREIGN PATENT DOCUMENTS

| | | | |
|---|---|---|---|
| EP | 2381421 | A2 | 10/2011 |
| EP | 2722656 | A1 | 4/2014 |
| EP | 2779027 | A1 | 9/2014 |
| JP | 2008210276 | A | 9/2008 |
| KR | 20110013200 | A | 2/2011 |
| KR | 20110117020 | A | 10/2011 |
| KR | 20120028109 | A | 3/2012 |
| WO | 2006095110 | A1 | 9/2006 |
| WO | 2007015059 | A1 | 2/2007 |
| WO | 2013033442 | A1 | 3/2013 |
| WO | 2013163789 | A1 | 11/2013 |
| WO | 2013166368 | A1 | 11/2013 |
| WO | 2013173985 | A1 | 11/2013 |
| WO | 2014019130 | A1 | 2/2014 |

OTHER PUBLICATIONS

Peter Clarke, Actuator Developer Claims Anti-Shake Breakthrough for Smartphone Cams, Electronic Engineering Times, p. 24, May 16, 2011.

U.S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

European Patent Office Action for Application No. 14157971.4-1906, Dated Jul. 16, 2014, 5 pages.

European Patent Search Report for Application No. 14157971.4-1906, Dated Jun. 30, 2014, 6 pages.

Caulier, Yannick et al., "A New Type of Color-Coded Light Structures for an Adapted and Rapid Determination of Point Correspondences for 3D Reconstruction." Proc. Of SPIE, vol. 8082 808232-3; 2011; 8 pages.

Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.

Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.

Proesmans, Marc et al. "Active Acquisition of 3D Shape for Moving Objects" 0-7803-3258-X/96 1996 IEEE; 4 pages.

Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.

U.S. Appl. No. 14/490,989, not yet published, Filed Sep. 19, 2014, Intermec IP Corporation, Volume Dimensioning System Calibration Systems and Methods.

Wikipedia, YUV description and definition, downloaded from http://www.wikipeida.org/wiki/YUV on Jun. 29, 2012, 10 pages.

YUV Pixel Format, downloaded from http://www.fource.org/yuv.php on Jun. 29, 2012; 13 pages.

YUV to RGB Conversion, downloaded from http://www.fource.org/fccyvrgb.php on Jun. 29, 2012; 5 pages.

Benos et al., "Semi-Automatic Dimensioning with Imager of a Portable Device," U.S. Appl. No. 61/149,912; Filed Feb. 4, 2009 (now expired), 56 pages.

Dimensional Weight—Wikipedia, the Free Encyclopedia, URL=http://en.wikipedia.org/wiki/Dimensional_weight, download date Aug. 1, 2008, 2 pages.

Dimensioning—Wikipedia, the Free Encyclopedia, URL=http://en.wikipedia.org/wiki/Dimensioning, download date Aug. 1, 2008, 1 page.

U.S. Appl. No. 14/519,179, Serge Thuries et al., filed Oct. 21, 2014, not published yet. 40 pages.

U.S. Appl. No. 14/519,249, H. Sprague Ackley et al., filed Oct. 21, 2014, not published yet. 36 pages.

U.S. Appl. No. 14/519,233, Franck Laffargue et al., filed Oct. 21, 2014, not published yet. 34 pages.

U.S. Appl. No. 14/519,211, H. Sprague Ackley et al., filed Oct. 21, 2014, not published yet. 33 pages.

U.S. Appl. No. 14/519,195, Franck Laffargue et al., filed Oct. 21, 2014, not published yet. 35 pages.

International Search Report for PCT/US2013/039438 (WO2013166368), Oct. 1, 2013, 7 pages.

U.S. Appl. No. 13/912,262, not yet published, Filed Jun. 7, 2013, Hand Held Products Inc., Method of Error Correction for 3D Imaging Device: 33 pages.

U.S. Appl. No. 14/453,019, not yet published, Filed Aug. 6, 2014, Hand Held Products Inc., Dimensioning System With Guided Alignment: 31 pages.

European Office Action for application EP 13186043, dated Jun. 12, 2014(now EP2722656 (Apr. 23, 2014)), Total of 6 pages.

U.S. Appl. No. 14/461,524, not yet published, Filed Aug. 18, 2014, Hand Held Products Inc., System and Method for Package Dimensioning: 21 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

(56) References Cited

OTHER PUBLICATIONS

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

EP Search and Written Opinion Report in related matter EP Application No. 14181437.6, Dated Mar. 26, 2015, 7 pages.

Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.

* cited by examiner

DIMENSIONING SYSTEM

CROSS-REFERENCE TO PRIORITY APPLICATION

The present application claims the benefit of U.S. Patent Application No. 61/841,717 for a Dimensioning System filed Jul. 1, 2013 (Fletcher), which is hereby incorporated by reference in its entirety.

FIELD OF THE INVENTION

The present invention relates to the field of dimensioning devices. More specifically, the present invention relates to a system for dimensioning packages.

BACKGROUND

Shipping companies typically charge customers for their services based on package size (i.e., volumetric weight) and/or weight (i.e., dead weight). When printing a shipping label for a package, a customer enters the size and/or weight of the package into a software application that bills the customer based on the information. Typically, customers get this size information by hand-measuring a package's dimensions (e.g., with a tape measure) and weighing the package on a scale. Hand-measurement of packages can be time-consuming and prone to errors. The customer may have difficulty positioning a tape measure on an irregularly-shaped package, for example. Alternatively, the customer may have difficulty reading a tape measure or may misread or erroneously record the dimension measurement. Problematically for the customer, when the shipping company later determines that the package is larger and/or heavier than reported by the customer, the shipping company may issue an additional charge to the customer. Additional bills may reduce customer satisfaction with the shipping experience, and, if the shipping customer is a retail company that has already passed along the shipping cost to an end customer, decrease the customer's earnings.

As such, a commercial need exists for systems that accurately and speedily collect a package's dimensions (e.g., length, width, height) for integration with billing systems to reduce errors in obtaining and transcribing that dimensional data.

SUMMARY

Accordingly, in one aspect, the present invention embraces an object-analysis system. The object-analysis system includes a sensor. The sensor detects the movement of a user's hand(s) within a three-dimensional space. The object-analysis system also includes a processor. The processor is communicatively connected to the sensor. The processor determines the dimensions of an object based on the detected movements of the user's hand(s).

In an exemplary embodiment, the sensor of the object-analysis system according to the present invention is a three-dimensional motion sensor.

In another exemplary embodiment, the sensor of the object-analysis system according to the present invention transmits information to the processor via a wireless connection.

In yet another exemplary embodiment, the sensor of the object-analysis system according to the present invention transmits information to the processor via a wired connection.

In yet another exemplary embodiment, the sensor of the object-analysis system according to the present invention transmits information to the processor via a USB connection.

In another aspect, the present invention embraces an object-analysis system that includes a three-dimensional motion sensor and a processor. The three-dimensional motion sensor detects the movements of a user's hand within a three-dimensional space with respect to an object. The processor is communicatively connected to the three-dimensional motion sensor. The processor is configured to determine the dimensions of the object based on the detected movements of the user's hand.

In an exemplary embodiment, the three-dimensional motion sensor is configured to detect the movements of both of the user's hands within a three-dimensional space with respect to an object.

In another exemplary embodiment, the three-dimensional motion sensor transmits information to the processor via a wireless connection.

In yet another exemplary embodiment, the three-dimensional motion sensor transmits information to the processor via a wired connection.

In yet another exemplary embodiment, the three-dimensional motion sensor transmits information to the processor via a USB connection.

In another aspect, the present invention embraces a method of determining the dimensions of an object. The movements of a user's first hand and a user's second hand within a three-dimensional space are detected. The dimensions of the object are determined based on the detected movements of the user's first hand and the user's second hand within the three-dimensional space.

In an exemplary method according to the present invention, the user's first hand and second hand are positioned to correspond to a first dimension of the object. The positioning of the user's first hand with respect to the user's second hand is assessed to thereby determine the length of the object.

In another exemplary method according to the present invention, the user's first hand and second hand are positioned to correspond to a second dimension of the object. The positioning of the user's first hand with respect to the user's second hand is assessed to thereby determine the width of the object.

In yet another exemplary method according to the present invention, the user's first hand and second hand are positioned to correspond to a third dimension of the object. The positioning of the user's first hand with respect to the user's second hand is assessed to thereby determine the height of the object.

In another aspect, the present invention embraces a method of determining the dimensions of an object. The motion of a first hand and a second hand within a three-dimensional space is detected. A first time period when the first hand and second hand are not moving is determined. A second time period when the first hand and second hand are not moving is determined. A first distance between the first hand and second hand during the first time period is determined. A second distance between the first hand and second hand during the second time period is determined. The dimensions of the object based on the first distance and second distance are determined.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect the present invention embraces an object-analysis system. The object-analysis system can be used to measure the dimensions (e.g., dimensioning) of an object (e.g., a box, a package, a container, a vessel). In particular, the object-analysis system according to the present invention may be used to measure the dimensions (e.g., length, width, and height) of a package, which dimensions may then be used to calculate the appropriate shipping costs (e.g., postage) of shipping the package via a courier (e.g., post office or private courier service). The object-analysis system according to the present invention advantageously replaces more time-consuming, traditional techniques employed to measure package size (e.g., volumetric weight), such as measuring with a tape measure, with a relatively faster technique that permits a user to obtain a measurement by placing the user's hand(s) on the object. The object-analysis system is capable of tracking the movements of the user's hand(s) and calculating the dimensions of the object based on the positioning of the hand(s) (e.g., by determining the distance between the user's hands). The object-analysis system according to the present invention advantageously detects the boundaries of the package by the movement and/or positioning of the user's hands, which may be especially useful in circumstances where automatic detection of the package's boundaries (e.g., edges) is inhibited, for example by the position of the package, lighting conditions, or the presence of other objects in the field-of-view.

Figure 1:
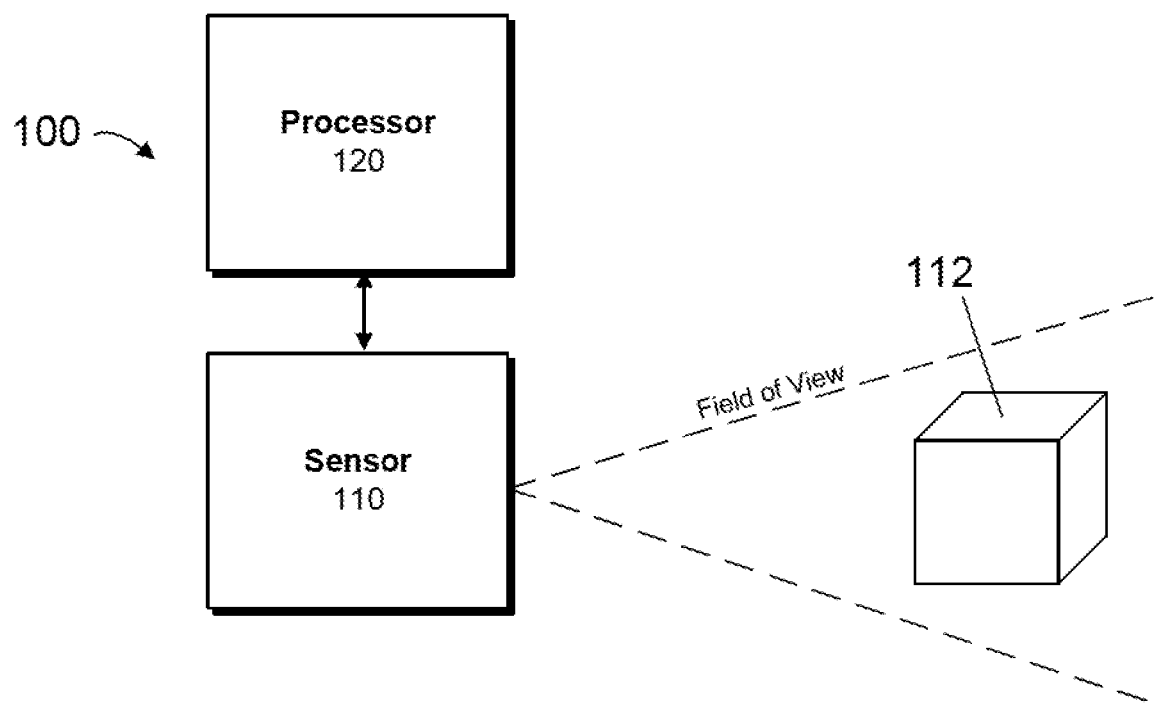
FIG. 1 is a block diagram of an exemplary object-analysis system according to the present invention.
Figure 2:
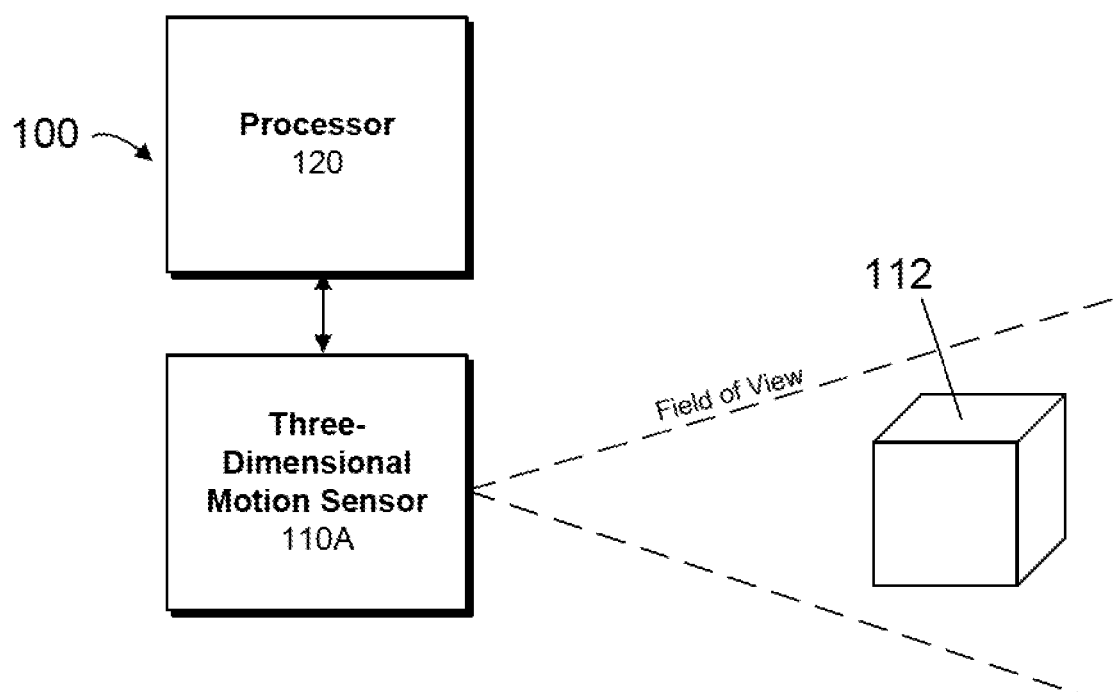
FIG. 2 is a block diagram of an alternative embodiment of an exemplary object-analysis system according to the present invention.

Referring now to FIGS. 1 and 2, the object-analysis system 100 according to the present invention includes a sensor 110. The sensor 110 detects the movement of a user's hand(s) within a three-dimensional space (e.g., three-dimensional physical space or x,y,z space). The size of the three-dimensional space in which the sensor 110 may be capable of detecting movement may vary, and is generally determined by the capabilities of the particular sensor 110. When measuring packages having a relatively large size (e.g., greater than about 0.125 $m^3$), a sensor 110 capable of detecting movement in relatively larger three-dimensional space may be required. Conversely, when measuring packages having a relatively small size (e.g., less than about 0.125 $m^3$), the sensor 110 may only be required to detect movement in a relatively smaller three-dimensional space. It will be appreciated by one skilled in the art that references to the movement of a user's hand are not limited to movements of the entire hand. Rather, such movements may include movements of a user's finger(s) (e.g., placing a package in between two of the user's fingers).

The sensor 110 may be any type of sensor capable of detecting the movement of a user's hand(s) within a three dimensional space. Typically, the sensor 110 is a three-dimensional motion sensor 110A capable of generating a two-dimensional image representing a three-dimensional subject. For example, the three-dimensional motion sensor 110A may be a range camera (e.g., structured light 3D scanner) capable of projecting a light beam (e.g., an infrared light beam) into a three-dimensional space, and then analyzing the pattern of the reflected light to determine the distance of each pixel from the range camera (e.g., analyzing deformities of each light pixel). Alternatively, a time-of-flight camera could be used as the three-dimensional motion sensor, whereby a light source (e.g., laser) is projected onto the field-of-view. The distance from the camera to the objects in the field-of-view is determined by recording the time it takes for the light beam to return to the sensor 110A, and then calculate the distance as a function of the time and speed of light. The sensor 110 may include other technology such as a wired glove (e.g., dataglove, cyberglove) to track the location of the user's hands in three-dimensional space, a stereoscopic camera, radar tracking device, microwave tracking device, or the like.

The object-analysis system also includes a processor 120 (e.g., a computer processor). The processor 120 is communicatively connected to the sensor 110. The processor 120 receives information (e.g., data) from the sensor 110 regarding the three-dimensional positioning and/or movements within the sensor's 110 field-of-view. The sensor 110 may transmit information to the processor 120 via a wireless connection (e.g., wifi connection, personal area network connection, Bluetooth connection, Zigbee connection). Alternatively, the sensor 110 may transmit information to the processor 120 via a wired connection (e.g., a serial cable connection, a universal serial bus (USB) connection, or a computer system bus connection).

The processor 120 determines the dimensions of an object 112 based on the detected movements of the user's hand(s). For example, when a user places the user's hands on opposing sides of an object 112 in the three-dimensional space within the sensor's 110 field-of-view, the sensor 110 detects the movement and positioning of the user's hands. The sensor 110 transmits the information relating to the movement and/or positioning of the user's hands to the processor 120. The processor 120 then analyzes the information received from the sensor 110 and calculates the distance between the user's hands. Because the user's hands are substantially adjacent to opposing sides of the object 112, the processor's 120 measurement of the distance between the user's hands closely approximates the object's 112 dimension (e.g., length, width, or height) defined by the distance between the opposing sides of the object 112. As mentioned, the user could alternatively use the user's fingers to help record a dimension. For smaller objects 112, in particular, the user could position a first finger on a first side of the object 112 and a second finger on an opposing side of the object 112. The sensor 110 then detects the movement and positioning of the user's fingers, and transmits that information to the processor 120. The processor 120 then calculates the distance between the user's first finger and second finger to determine the desired dimension. Using this approach, the object-analysis system 100 according to the present invention could facilitate the dimensioning of small packages and even smaller objects. For example, certain manufacturing applications may require measurements of certain components. To the extent those components could be held in one hand, the user could obtain a dimensional measurement by placing the user's fingers on opposing sides of the object. This could be particularly useful in assembly lines where a priority is placed on rapid and accurate measurement of components.

To allow the system to more readily identify the user's hands (or fingers) as they pass through the three-dimensional space, and to distinguish the user's hands from the object 112, the object-identification system 100 may include an identification marker identifying at least a portion of the user's hand. The identification marker may include gloves, wristbands, or rings that, when detected by the sensor 110, could assist the object-identification system 100 in recognizing the user's hands and distinguishing them from objects 112 or other items in the three-dimensional space.

In an alternative exemplary embodiment, the object-identification system 100 may obtain dimensional measurements of an object 112 by reference to a user's hand and another measurement point. Typically, the other measurement point is the supporting surface (e.g., floor, table) on which the object 112 is positioned. For example, the user positions the user's hand on the top surface of the object 112, and the sensor 110 could detect the movement and/or positioning of the user's hand with respect to the supporting surface. Using the positioning and movement information provided by the sensor 110, the processor 120 determines the dimension (in this case, the height) of the object 112 by measuring the distance from the user's hand to the supporting surface. To obtain a second dimensional measurement, the user then repositions the object 112 such that the distance between the top surface of the repositioned object 112 and the supporting surface represents the desired second dimension (e.g., width) of the object 112.

In another embodiment, the sensor 110 detects and records the movement of the user's hand over the surfaces of the object 112. The user may move one hand or both hands over the surfaces of the object 112. The processor 120 analyzes the information regarding the movement of the user's hand, and derives from that information the edges between the different planar surfaces. For example, the processor 120 can derive the presence of an edge from a substantially 90-degree change of direction in the movement of the user's hand. The processor 120 uses the information regarding the edge locations to calculate the dimensions of the object 112.

In an exemplary embodiment, the object-analysis system 100 according to the present invention initiates a measurement of a dimension of the object 112 upon a triggering event by the user. Typically, the triggering event is the user holding the user's hands still (e.g. not moving the user's hands) within the three-dimensional area for a pre-determined period of time. For example, after the user places the user's hands on opposing sides of the object 112, the user holds the user's hands in place for a pre-determined time period (e.g., about 1 second). Upon detecting that the hands have not moved for the pre-determined period of time, the processor 120 initiates a calculation of the distance between the user's hands based on the information relayed to the processor 120 by the sensor 110. By eliminating the need for the user to manually initiate the dimension measurement (e.g., by pushing a button), the object-analysis system 100 according to the present invention advantageously provides the user the ability to rapidly progress through each measurement.

In another embodiment, the processor 120 may derive the dimensions of the object 112 as a function of the time that it takes for the user to reposition the user's hands from one surface to another.

Figure 3:
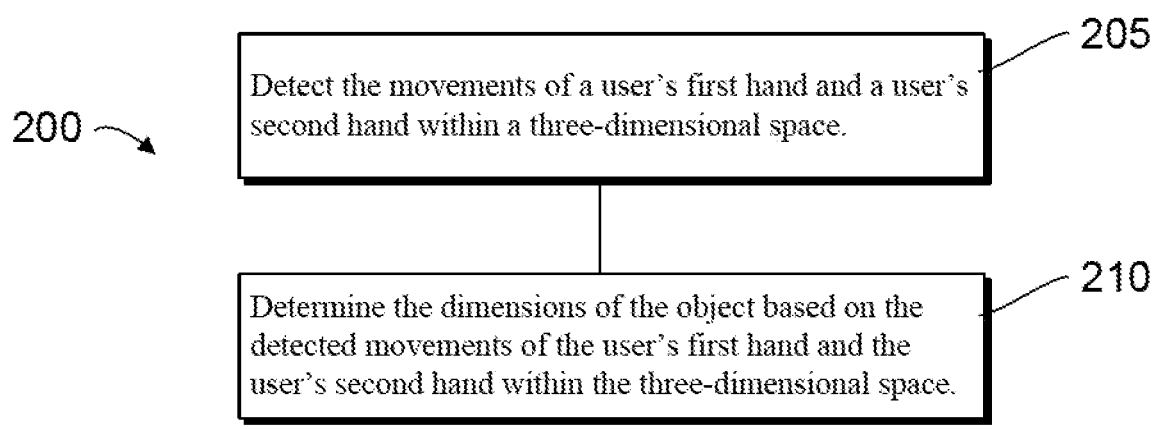
FIG. 3 is a flow chart illustrating an exemplary method of determining the dimensions of an object according to the present invention.
Figure 4:
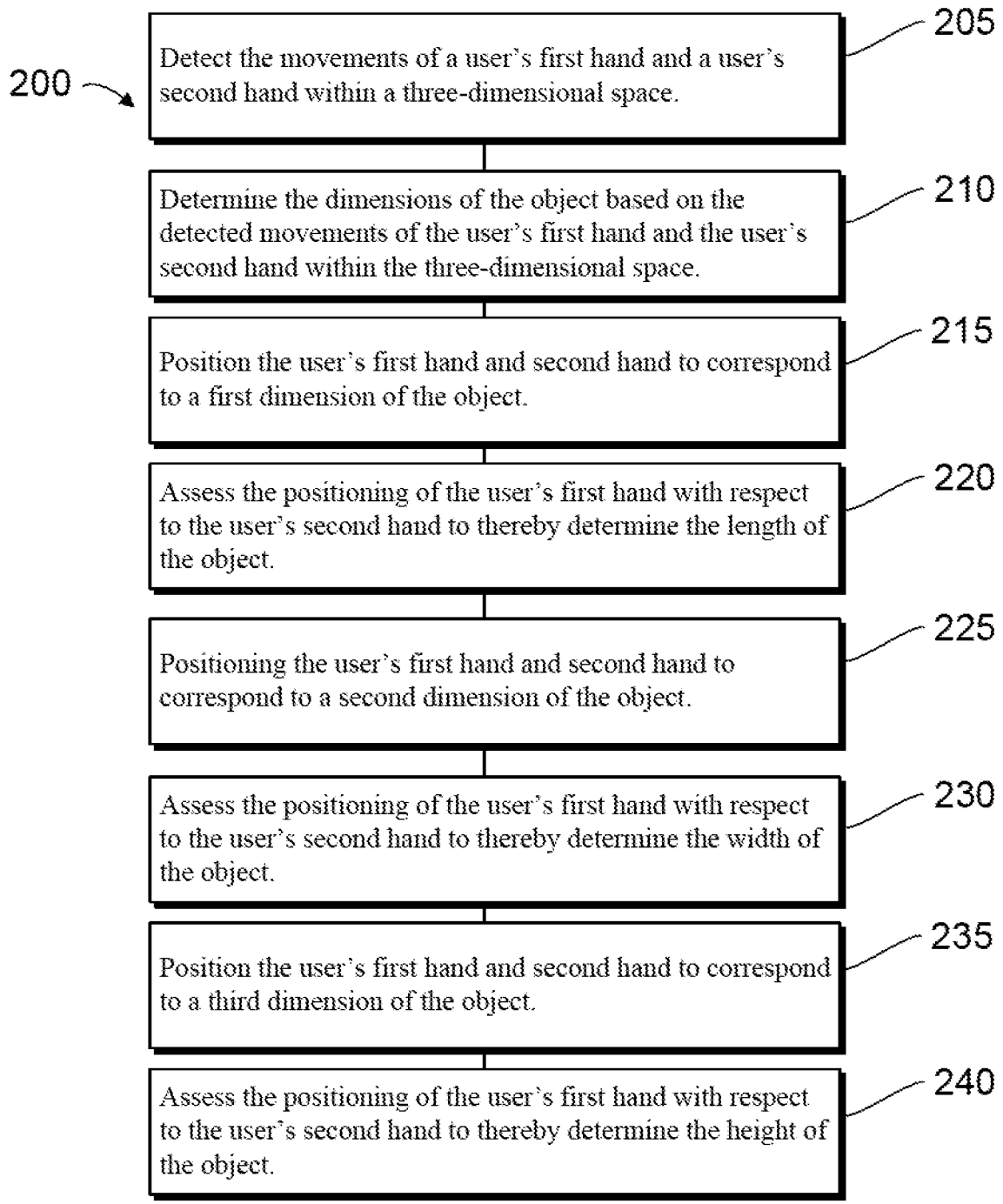
FIG. 4 is a flow chart illustrating an alternative embodiment of an exemplary method of determining the dimensions of an object according to the present invention.

In another aspect, the present invention embraces a method of determining the dimensions of an object 112. Referring now to FIGS. 3 through 4, an exemplary method 200 according the present disclosure includes detecting the movements of a user's first hand and a user's second hand within a three-dimensional space (205). Typically, the movements are detected using a sensor 110 (e.g., a three-dimensional sensor 110A, a range camera). The method 200 also includes determining the dimensions of the object 112 based on the detected movements of the user's first hand and the user's second hand within the three-dimensional space (210). Typically, the dimensions are determined using a processor 120 configured to calculate the dimensions of the object 112 based on information about the movement of the user's hands in the three-dimensional space.

In an exemplary embodiment, the method 200 according to the present invention also includes positioning the user's first hand and second hand to correspond to a first dimension of the object 112 (215). The method 200 also includes assessing the positioning of the user's first hand with respect to the user's second hand to thereby determine the length of the object 112 (220).

In an exemplary embodiment, the method 200 according to the present invention also includes positioning the user's first hand and second hand to correspond to a second dimension of the object 112 (225). The method 200 also includes assessing the positioning of the user's first hand with respect to the user's second hand to thereby determine the width of the object 112 (230).

In an exemplary embodiment, the method 200 according to the present invention also includes positioning the user's first hand and second hand to correspond to a third dimension of the object 112 (235). The method 200 also includes assessing the positioning of the user's first hand with respect to the user's second hand to thereby determine the height of the object 112 (240).

When measuring more than one dimension (e.g., a first dimension and a second dimension) using the method 200 according to the present invention, the user may position the user's hands on the object 112 in any order. In other words, the user may first position the user's hands to correspond to the object's length, or the user may first position the user's hands to correspond to the object's width.

Figure 5:
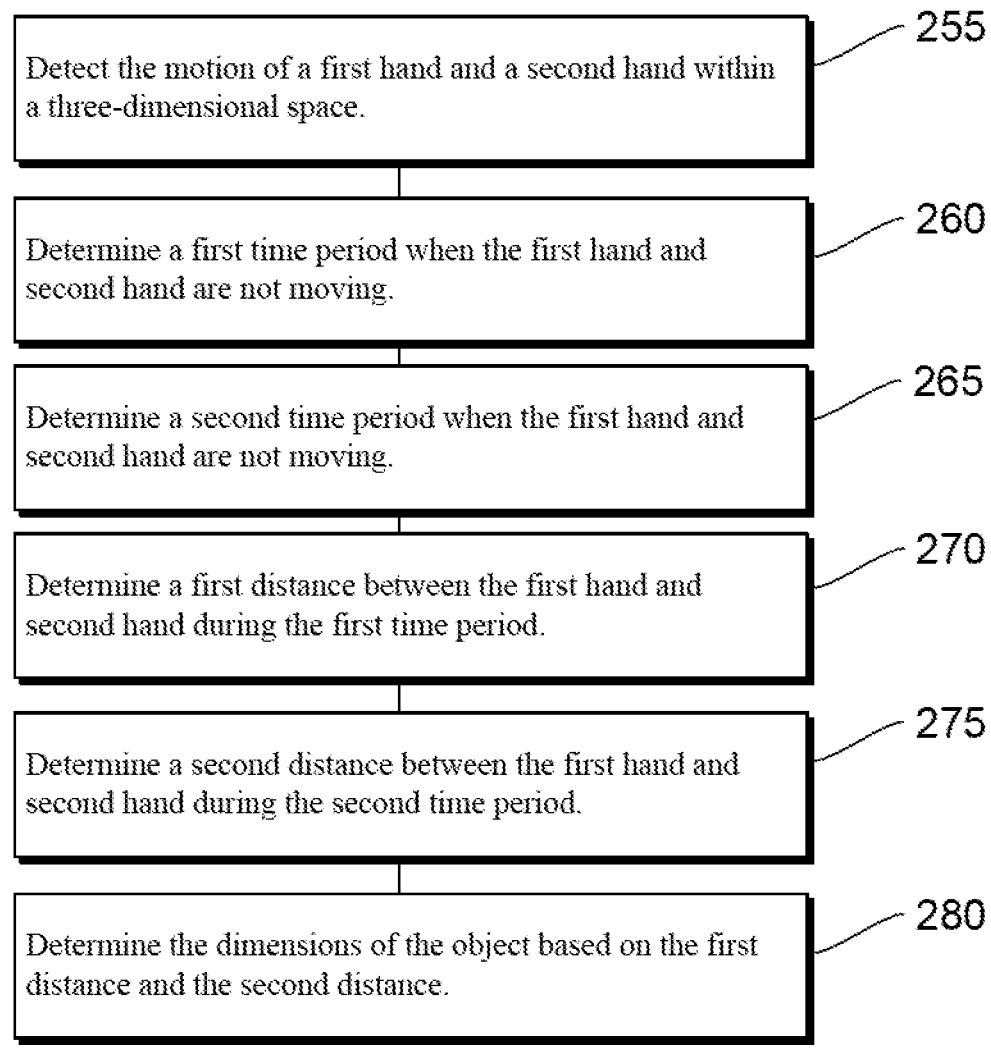
FIG. 5 is a flow chart illustrating another exemplary method of determining the dimensions of an object according to the present invention.

Referring now to FIG. 5, in another aspect, the present invention embraces a method 200 of determining the dimensions of an object 112. The method 200 includes detecting the motion of a first hand and a second hand within a three-dimensional space (255). The method 200 also includes determining a first time period when the first hand and second hand are not moving (260). The method 200 also includes determining a second time period when the first hand and second hand are not moving (265). The method 200 also includes determining a first distance between the first hand and second hand during the first time period (270), and determining a second distance between the first hand and second hand during the second time period (275). The method 200 also includes determining the dimensions of the object based on the first distance and the second distance (280).

To supplement the present disclosure, this application incorporates entirely by reference the following patents, patent application publications, and patent applications: U.S. Pat. No. 6,832,725; U.S. Pat. No. 7,159,783; U.S. Pat. No. 7,128,266; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,556,176 U.S. Pat. No. 8,561,905; U.S. Pat. No. 8,523,076; U.S. Pat. No. 8,528,819; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S.

Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. Patent Application Publication No. 2013/0175343; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/432,197 for a Laser Scanning System Using Laser Beam Sources For Producing Long And Short Wavelengths In Combination With Beam-Waist Extending Optics To Extend The Depth Of Field Thereof While Resolving High Resolution Bar Code Symbols Having Minimum Code Element Widths, filed Mar. 28, 2012 (Havens et al.); U.S. patent application Ser. No. 13/492,883 for a Laser Scanning Module With Rotatably Adjustable Laser Scanning Assembly, filed Jun. 10, 2012 (Hennick et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An object-analysis system, comprising:
   a sensor for detecting the movement of both of a user's hands within a three-dimensional space with respect to an object; and
   a processor communicatively connected to the sensor, the processor being configured to determine the dimensions of the object based on the detected movements of the user's hands.

2. The object-analysis system according to claim 1, wherein the sensor transmits information to the processor via a wireless connection.

3. The object-analysis system according to claim 1, wherein the sensor transmits information to the processor via a wired connection.

4. The object-analysis system according to claim 1, wherein the sensor transmits information to the processor via a USB connection.

5. The object-analysis system according to claim 1, wherein the processor is configured to determine a first dimension of the object by assessing the positioning of the user's first hand with respect to the user's second hand.

6. The object-analysis system according to claim 1, wherein the processor is configured to determine the dimensions of the object by:
   detecting the motion of the user's first hand and the user's second hand within a three-dimensional space;
   determining a first time period when the first hand and second hand are not moving;
   determining a second time period when the first hand and second hand are not moving;
   determining a first distance between the first hand and second hand during the first time period;
   determining a second distance between the first hand and second hand during the second time period; and
   determining the dimensions of the object based on the first distance and the second distance.

7. An object-analysis system, comprising:
   a three-dimensional motion sensor for detecting the movements of both of a user's hands within a three-dimensional space with respect to an object; and
   a processor communicatively connected to the three-dimensional motion sensor, the processor being configured to determine the dimensions of the object based on the detected movements of the user's hand.

8. The object-analysis system according to claim 7, wherein the three-dimensional motion sensor transmits information to the processor via a wireless connection.

9. The object-analysis system according to claim 7, wherein the three-dimensional motion sensor transmits information to the processor via a wired connection.

10. The object-analysis system according to claim 7, wherein the three-dimensional motion sensor transmits information to the processor via a USB connection.

11. The object-analysis system according to claim 7, wherein the processor is configured to determine a first dimension of the object by assessing the positioning of the user's first hand with respect to the user's second hand.

12. The object-analysis system according to claim 7, wherein the processor is configured to determine the dimensions of the object by:
   detecting the motion of the user's first hand and the user's second hand within a three-dimensional space;
   determining a first time period when the first hand and second hand are not moving;
   determining a second time period when the first hand and second hand are not moving;
   determining a first distance between the first hand and second hand during the first time period;
   determining a second distance between the first hand and second hand during the second time period; and
   determining the dimensions of the object based on the first distance and the second distance.

13. A method of determining the dimensions of an object, comprising:
   detecting the movements of a user's first hand and a user's second hand within a three-dimensional space; and
   determining the dimensions of the object based on the detected movements of the user's first hand and the user's second hand within the three-dimensional space.

14. The method according to claim 13, comprising
   positioning the user's first hand and second hand to correspond to a first dimension of the object;
   assessing the positioning of the user's first hand with respect to the user's second hand to thereby determine the length of the object.

15. The method according to claim 14, comprising
   positioning the user's first hand and second hand to correspond to a second dimension of the object;
   assessing the positioning of the user's first hand with respect to the user's second hand to thereby determine the width of the object.

16. The method according to claim 13, comprising
   positioning the user's first hand and second hand to correspond to a third dimension of the object;
   assessing the positioning of the user's first hand with respect to the user's second hand to thereby determine the height of the object.

17. A method of determining the dimensions of an object, comprising:
   detecting the motion of a first hand and a second hand within a three-dimensional space;
   determining a first time period when the first hand and second hand are not moving;
   determining a second time period when the first hand and second hand are not moving;
   determining a first distance between the first hand and second hand during the first time period;
   determining a second distance between the first hand and second hand during the second time period; and
   determining the dimensions of the object based on the first distance and the second distance.

18. The method of claim 17, comprising:
   determining a third time period when the first hand and second hand are not moving;
   determining a third distance between the first hand and second hand during the second time period; and
   determining the dimensions of the object based on the first distance, the second distance, and the third distance.

19. The method of claim 17, wherein the motion of a first hand and a second hand within a three-dimensional space is detected with a range image camera.

20. The method of claim 17, wherein the first time period is about 1 second.

* * * * *